United States Patent [19]
Hayakawa

[11] Patent Number: 5,598,299
[45] Date of Patent: Jan. 28, 1997

[54] PHOTOGRAPHIC LENS HAVING IMAGE STABILIZING FUNCTION

[75] Inventor: Shingo Hayakawa, Kanagawa-ken, Japan

[73] Assignee: Canon Kabushiki Kaisha, Tokyo, Japan

[21] Appl. No.: 425,749

[22] Filed: Apr. 20, 1995

[30] Foreign Application Priority Data

Apr. 27, 1994 [JP] Japan .................................. 6-112052

[51] Int. Cl.$^6$ .................................................. G02B 27/64
[52] U.S. Cl. .............................................. 359/557; 359/554
[58] Field of Search ...................................... 359/554–557, 359/676–677, 683, 689–692, 793, 795

[56] References Cited

U.S. PATENT DOCUMENTS

| | | | |
|---|---|---|---|
| 4,907,868 | 3/1990 | Kitagishi et al. | 359/557 |
| 4,927,250 | 5/1990 | Suda | 359/557 |
| 4,974,950 | 12/1990 | Yamazaki et al. | 359/557 |
| 5,000,549 | 3/1991 | Yamazuki | 359/557 |

FOREIGN PATENT DOCUMENTS

| | | |
|---|---|---|
| 50-80147 | 6/1975 | Japan . |
| 56-21133 | 5/1981 | Japan . |
| 56-34847 | 8/1981 | Japan . |
| 57-7414 | 2/1982 | Japan . |
| 61-223819 | 10/1986 | Japan . |

*Primary Examiner*—Thong Nguyen
*Attorney, Agent, or Firm*—Fitzpatrick, Cella, Harper & Scinto

[57] ABSTRACT

A photographic lens system having an image stabilizing function is disclosed, comprising, from front to rear, a first lens unit of positive refractive power and a second lens unit of negative refractive power, the second lens unit having a front lens sub-unit of negative refractive power and a rear lens sub-unit of positive refractive power, the first lens unit being moved axially to effect focusing, the front lens sub-unit being moved in directions perpendicular to an optical axis to correct the shake of an image at the focal plane, and the following conditions being satisfied:

$$0.35 < f1/f < 0.95$$

$$0.2 < \Delta L/f2 < 0.8$$

where $f1$ and $f$ are the focal lengths of the first lens unit and the entire system, respectively, and $\Delta L$ is the maximum focusing movement of the first lens unit.

4 Claims, 7 Drawing Sheets

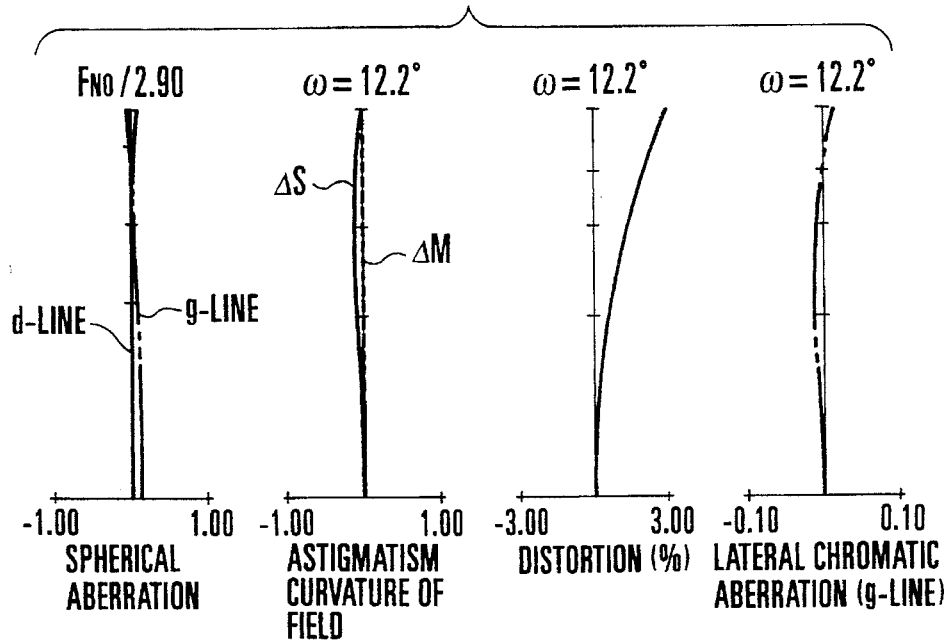
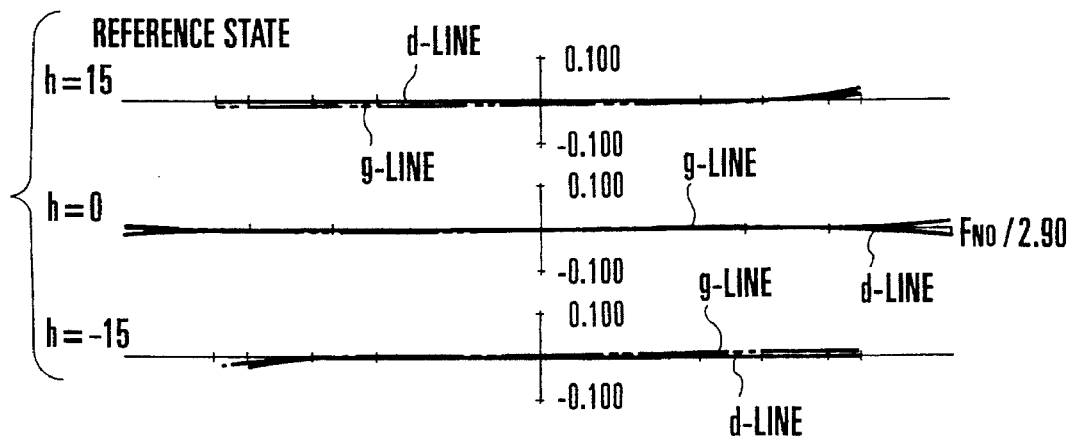
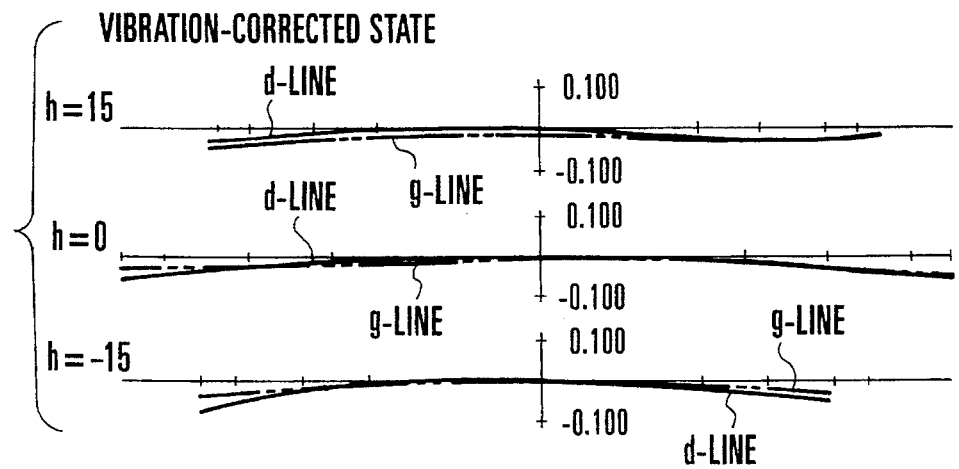

PHOTOGRAPHIC LENS HAVING IMAGE STABILIZING FUNCTION

BACKGROUND OF THE INVENTION

1. Field of the Invention

This invention relates to optical systems having a function of correcting the shake of an image at the focal plane against vibrations of the housing thereof, or so-called "image stabilizing" function and, more particularly to optical systems having the image stabilizing function in which a movable lens unit for decentering is moved in directions, for example, perpendicular to an optical axis to effect stabilizing of the image, while still permitting the optical performance to be prevented from being lowered particularly when in close-up photography.

2. Description of the Related Art

In the use of a camera on a running car, flying aircraft, or other moving vehicles, vibrations are propagated to the photographic system (taking lens), causing an image to shake at the focal plane. In particular, for a photographic system of long focal length to be used, when the camera is held by hand, it becomes difficult to suppress the angle deviation of the photographic system from a desired line of sight. As the housing of the photographic system tilts accidentally, displacement of the image on the focal plane occurs to a magnitude depending on the angle of inclination of the housing with respect to the line of sight and the focal length of the photographic system. For this reason, the camera for still pictures gets a problem that the exposure time must be short enough to avoid deterioration of the image quality. The motion picture camera, too, suffers a problem that it becomes difficult to keep the composition for pictures to a desired setting. On occasions such as these, therefore, it becomes necessary to compensate the photographic system against small accidental angle deviations thereof from the line of sight so that displacement of the image at the focal plane, or so-called shake of the image, does not take place.

There have been previous proposals for providing a stationary image in optical systems as, for example, disclosed in Japanese Laid-Open Patent Application No. Sho 50-80147, Japanese Patent Publication No. Sho 56-21133 and Japanese Laid-Open Patent Application No. Sho 61-223819.

In Japanese Laid-Open Patent Application No. Sho 50-80147, two afocal zooming sections are used to form a zoom lens, wherein zooming is performed in each of these sections in such relation that, letting the angular magnifications of the first and second zooming sections be denoted by $M_1$ and $M_2$, respectively, $M_1 = 1 - 1/M_2$ is maintained, and also wherein the second zooming section is held in fixed spatial alignment with the line of sight to thereby correct the image shake. Stabilization of the image is thus achieved.

In Japanese Patent Publication No. Sho 56-21133, vibrations of the housing of the optical instrument are sensed by a detector. Depending on the output signal from the detector, an optical member constituting part of the optical system is moved in a direction to cancel the accidental displacement of the image. The image is thus maintained stationary.

In Japanese Laid-Open Patent Application No. Sho 61-223819, a variable angle prism of the refraction type is arranged in front of a photographic system to deflect light rays that are going to the image frame, wherein the apex angle of this prism is made equal to the angular deviation of the photographic system from the line of sight. The image is thus stabilized.

Besides these, in Japanese Patent Publications Nos. Sho 56-34847 and Sho 57-7414, one of the lenses of a photographic system is held in fixed spatial alignment with the line of sight so that, when the housing of the photographic system vibrates, a prism is generated to deflect the light rays that enter the film gate. The stabilized image is thus obtained at the focal plane.

It is also known to utilize an acceleration sensor for detecting the vibrations of the housing of the photographic system. The output signal of this sensor is translated to the transverse movement of one lens unit of the photographic system across the optical axis thereof. Thus, the image stabilizing function is realized.

In general, for the image stabilizing photographic systems of the type in which a lens unit is made movable for correcting the image shake, there have been great demands for their operating mechanisms to have a high dynamic range for correction of the image shake and also for the image stabilizing lens unit (movable lens unit) to have a short range of movement or rotation.

As the movable lens unit is decentered, aberrations are produced. If the decentering coma, decentering astigmatism, decentering chromatic aberrations and decentering curvature of field are large, the image is caused to blur, even though the image is stabilized. For example, if large decentering distortion is produced, the moved amount of the paraxial zone in the image frame differs from that of the marginal zone. For this reason, if the movable lens is transversed to a distance determined to correct the image shake in the paraxial zone, it results in the marginal zone that a similar phenomenon to the image shake takes place, causing the optical characteristics be lowered extremely.

To provide the optical system with the image stabilizing function, therefore, it is demanded that, when the movable lens unit is decentered either by moving in the direction perpendicular to the optical axis, or by rotating about a point on the optical axis to small angles, the amount of decentering aberrations produced is limited to a minimum in order to minimize the detraction from the professional image quality. For another purpose of minimizing the size of the housing of the instrument containing the optical system, it is also demanded that larger shaking movements of the image can be corrected by smaller transverse or rotative movements of the image stabilizing lens unit, in other words, the so-called decenter sensitivity (the ratio of the corrected amount of shaking movement, $\Delta x$, of the image to the unity of decentering movement, $\Delta H$, or $\Delta x/\Delta H$) is large enough.

Of the types of image stabilizing optical systems, the one having the additional optical member arranged to be spatially fixed against vibrations, is not suited to be used in the instrument whose prerequisites in design are partly in small size and light weight, because difficult techniques must be used to support this optical member and also because the optical system is hardly constructed in compact form. Another type which uses the variable angle prism in front of the photographic system has an advantage that, when correcting the image shake, almost no decentering aberrations except decentering chromatic aberrations are produced, but there are drawbacks that the drive member is necessarily large in size and that the decentering chromatic aberrations produced by the prism are difficult to correct by any simple techniques. The other type which decenters part of the optical system, or one lens unit, is amenable to the techniques of minimizing the size of the instrument by making appropriate the selection and arrangement of the lens unit for decentering, but suffers a difficult problem of realizing sufficient correction of large displacements of the image by sufficiently short decentering movements while properly correcting the various aberrations produced by the decentering, i.e., the decentering coma, the decentering astigmatism, the decentering curvature of field, etc.

As another related proposal, there are U.S. Pat. Nos. 4,974,950 and 5,000,549.

SUMMARY OF THE INVENTION

The present invention is to provide an optical system of the type in which one lens unit is made movable for decentering in directions perpendicular to an optical axis to correct the displacement (shake) of an image. To correct well various decentering aberrations, proper rules of design are set forth for the construction and arrangement of the constituent lenses. It is also realized that correction of large image displacements (shakes) is made good enough by sufficiently short decentering movements, thereby making it possible to minimize the size of the housing of the optical system. It is, therefore, an object of the invention to provide an optical system having the image stabilizing function suited to close-up photography with image magnifications of ½ times to unity.

According to the invention, an optical system having the image stabilizing function comprises, from front to rear, a first lens unit of positive refractive power and a second lens unit of negative refractive power, the second lens unit including a front lens sub-unit of negative refractive power and a rear lens sub-unit of positive refractive power, and focusing being performed by axially moving the first lens unit, wherein the front lens sub-unit is made movable in directions perpendicular to an optical axis so as to correct shaking of an image, and the following conditions are satisfied:

$$0.35 < f1/f < 0.95 \quad (1)$$

$$0.2 < \Delta L/f1 < 0.8 \quad (2)$$

where f1 and f are the focal lengths of the first lens unit and the entire system, respectively, and $\Delta L$ is the maximum focusing movement of the first lens unit.

BRIEF DESCRIPTION OF THE DRAWINGS

FIG. 3 shows graphic representations of the various aberrations of the numerical example 1 of the invention with an object at infinity;

FIG. 4 shows meridional ray plots for the numerical example 1 of the invention with an object at infinity;

FIG. 5 shows meridional ray plots for the numerical example 1 of the invention with an object at infinity and with the shake of the image corrected at the focal plane against 1° vibration of the housing of the optical system from the original line of sight;

Figure 1A:
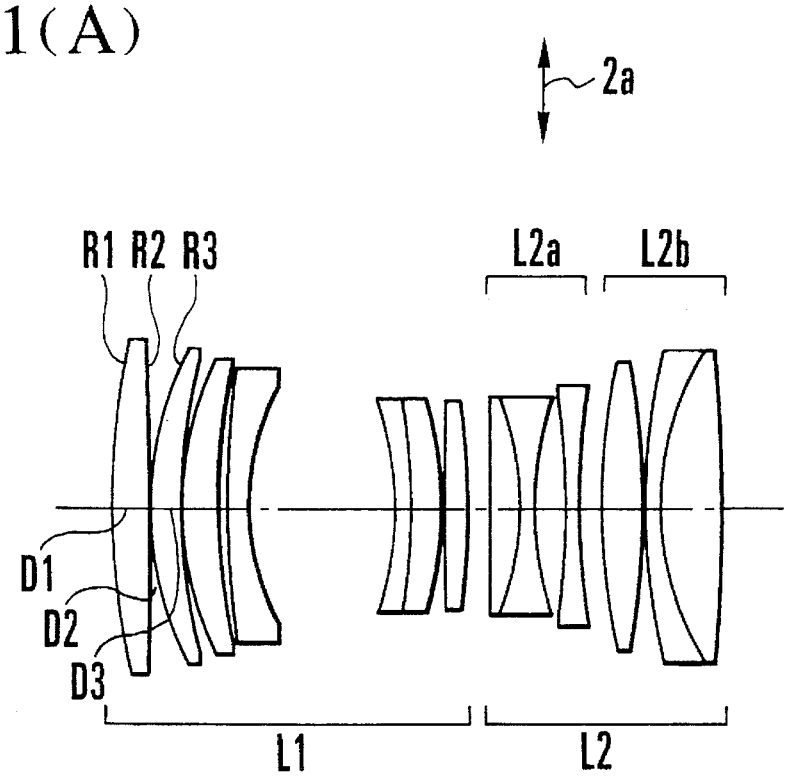
Figs. 1(A) and 1(B) are lens block diagrams of a numerical example 1 of the invention.

In the lens block diagrams, reference character L1 denotes the first lens unit; L2 the second lens unit; L2a the front lens sub-unit; and L2b the rear lens subunit. In the aberration curves, h stands for height, d for the spectral d-line, g for the spectral g-line, $\Delta M$ for the meridional image focus and $\Delta S$ for the sagittal image focus.

DETAILED DESCRIPTION OF THE PREFERRED EMBODIMENTS

Figure 1B:
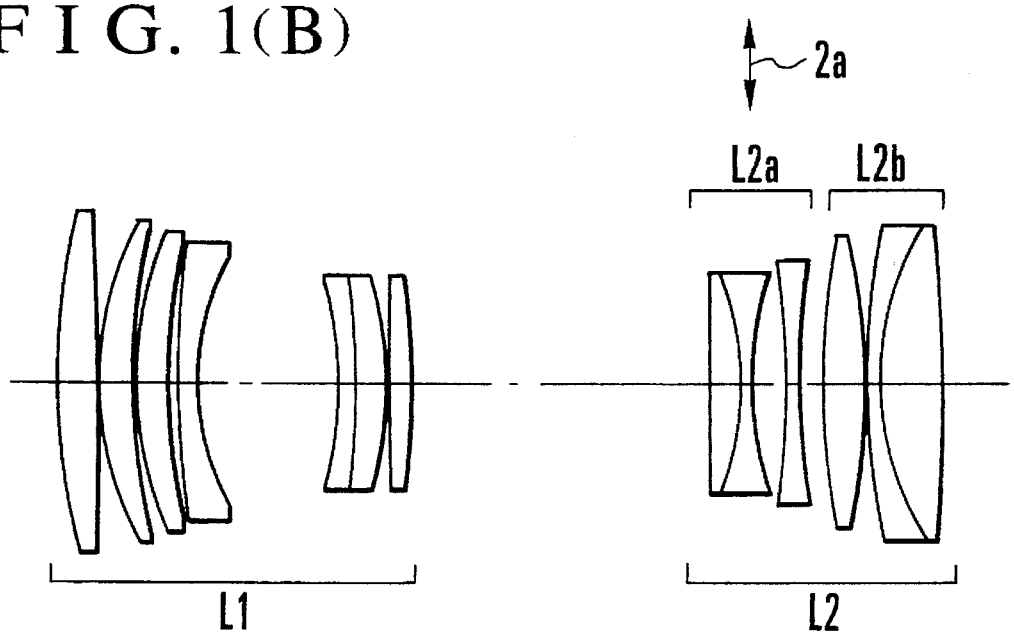
Figure 2A:
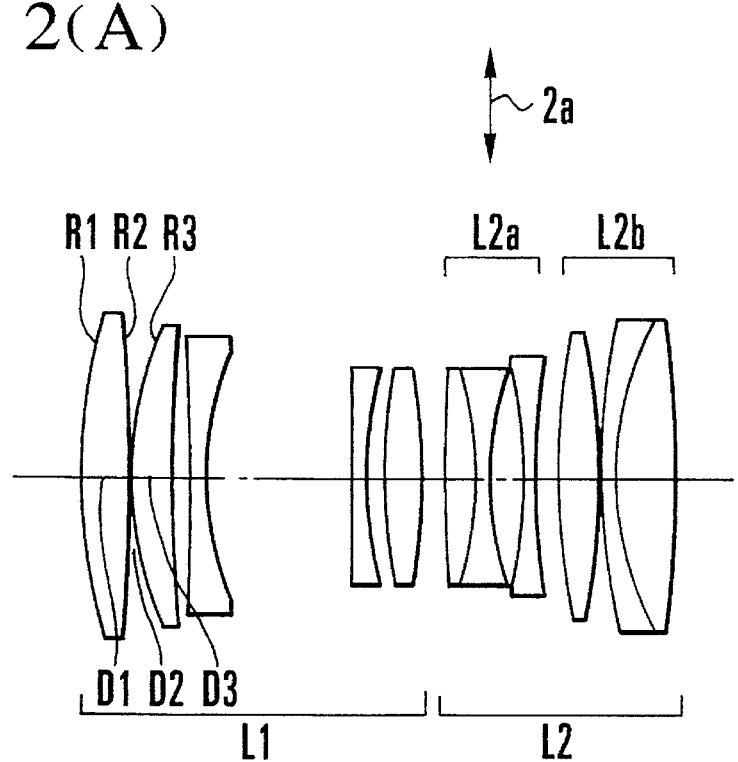
FIGS. 2(A) and 2(B) are lens block diagrams of a numerical example 2 of the invention.
Figure 2B:
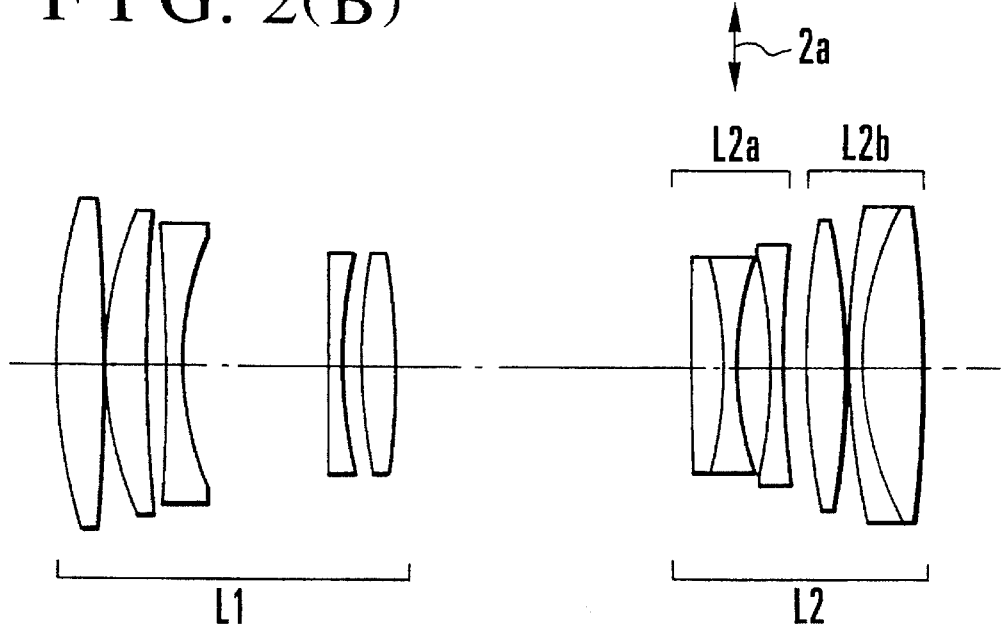
Figure 6:
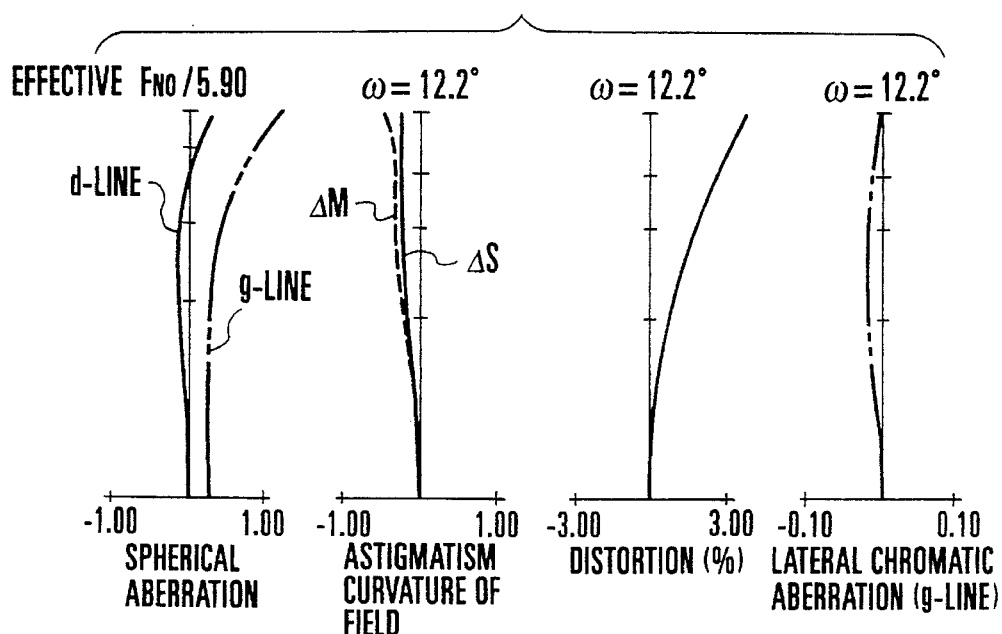
FIG. 6 shows graphic representations of the various aberrations of the numerical example 1 of the invention with an object at a minimum distance (for $\beta=-1$)
Figure 7:
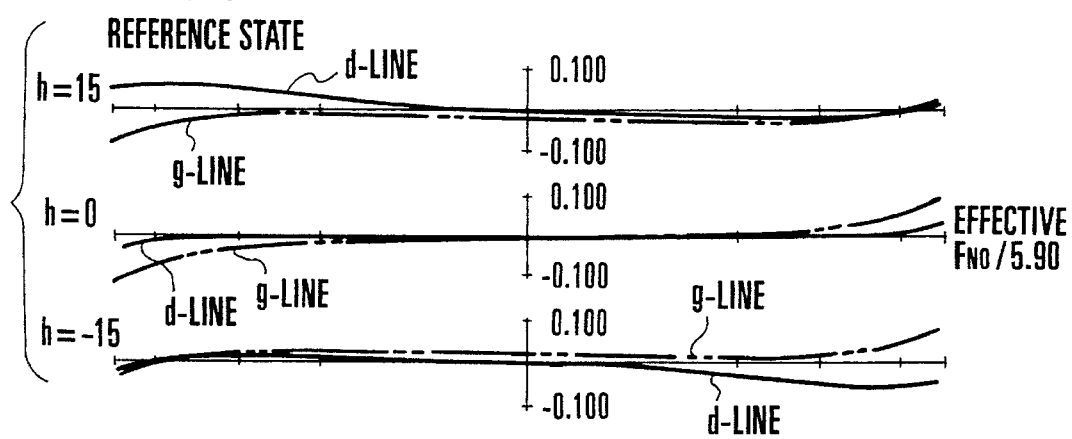
FIG. 7 shows meridional ray plots for the numerical example 1 of the invention with an object at a minimum distance (for $\beta=-1$)
Figure 8:
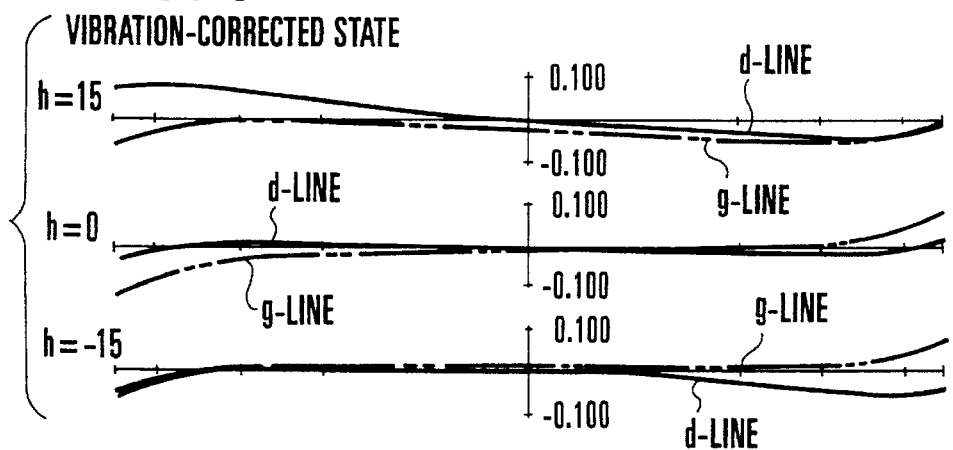
FIG. 8 shows meridional ray plots for the numerical example 1 of the invention with an object at a minimum distance (for $\beta=-1$) and with the image shake corrected at the focal plane against 1° vibration of the housing of the optical system from the original line of sight.
Figure 9:
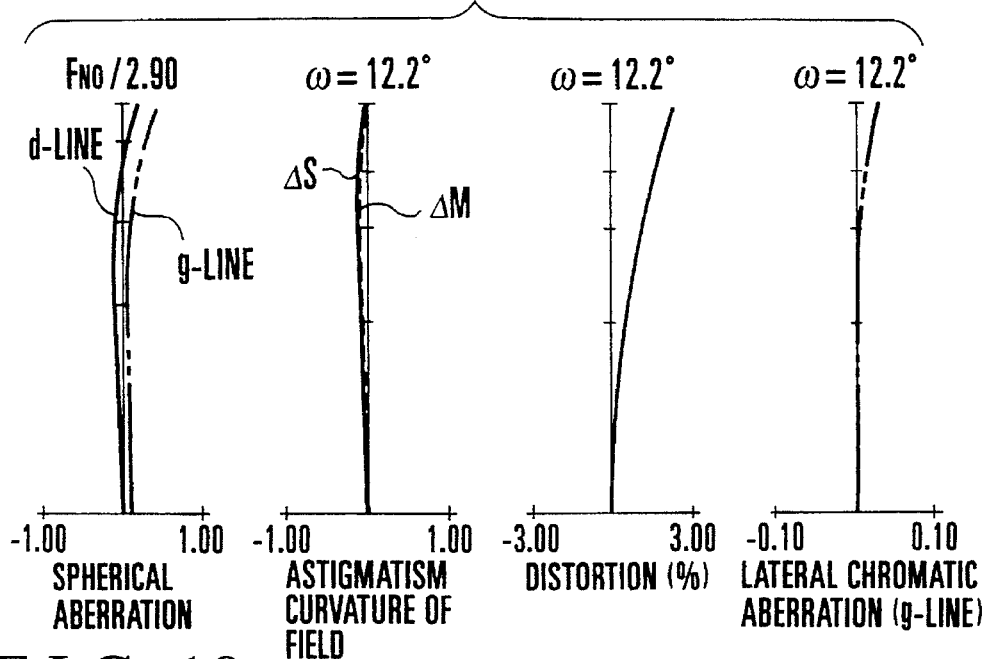
FIG. 9 shows graphic representations of the various aberrations of the numerical example 2 of the invention with an object at infinity.
Figure 10:
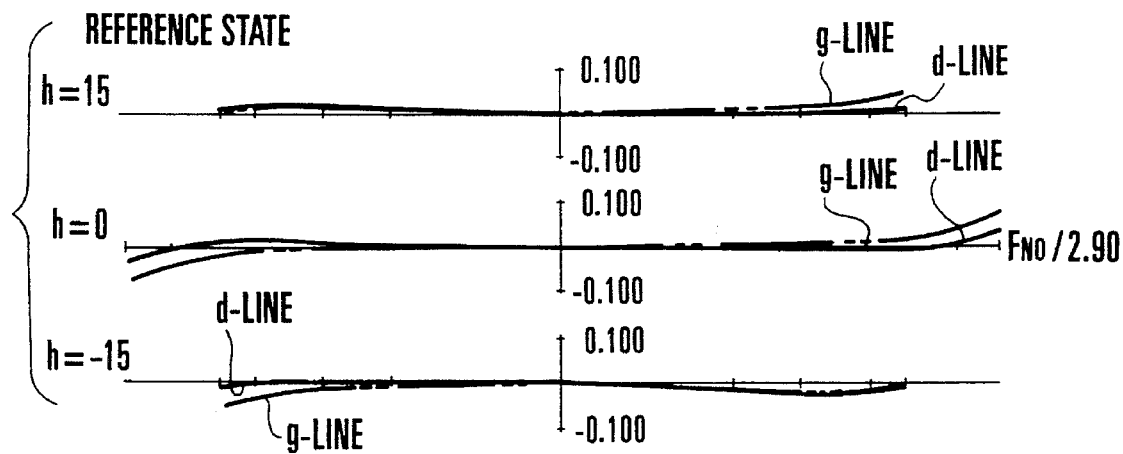
FIG. 10 shows meridional ray plots for the numerical example 2 of the invention with an object at infinity.
Figure 11:
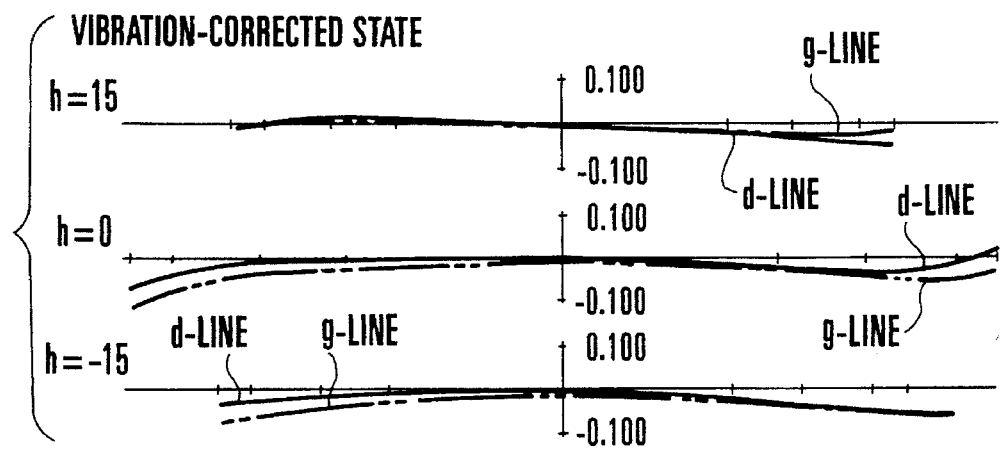
FIG. 11 shows meridional ray plots for the numerical example 2 of the invention with an object at infinity and with the image shake corrected at the focal plane against 1° vibration of the housing of the optical system from the original line of sight.
Figure 12:
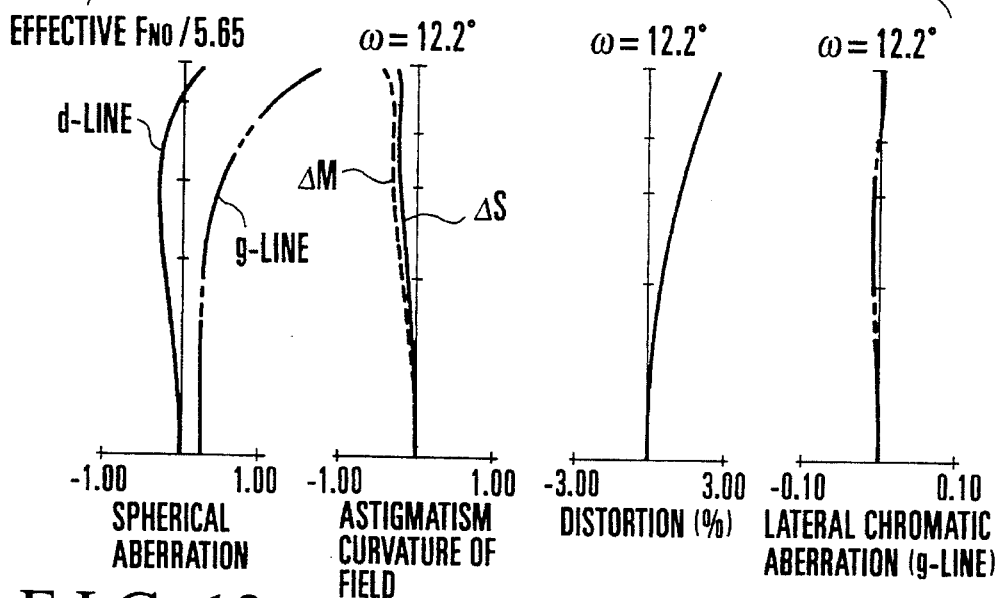
FIG. 12 shows graphic representations of the various aberrations of the numerical example 2 of the invention with an object at a minimum distance (for $\beta=-1$)
Figure 13:
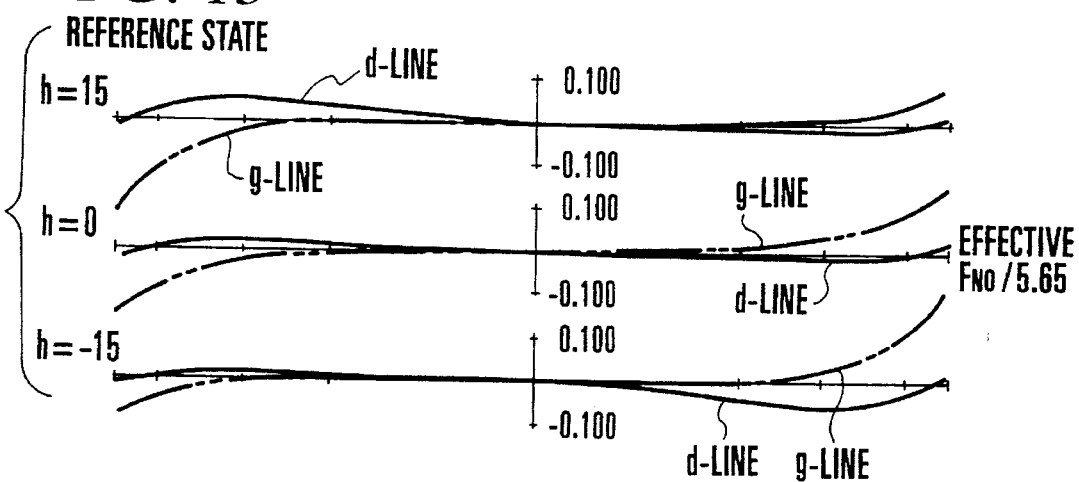
FIG. 13 shows meridional ray plots for the numerical example 2 of the invention with an object at a minimum distance (for $\beta=-1$)
Figure 14:
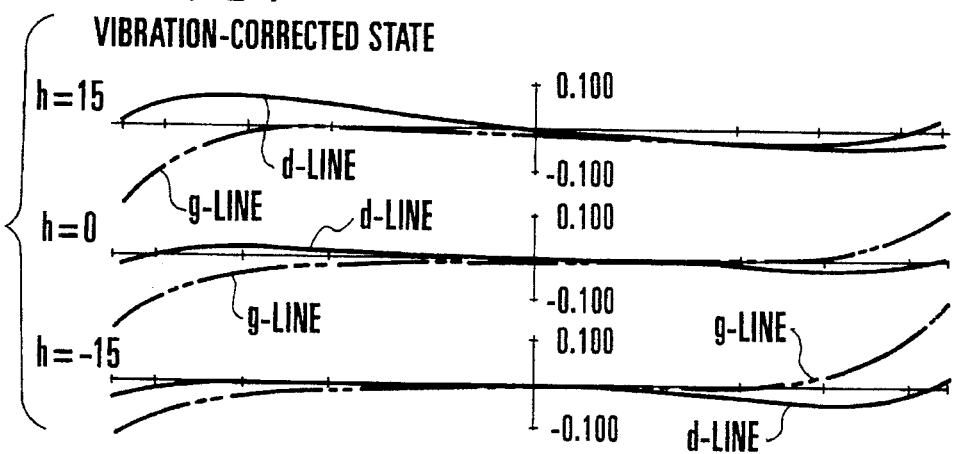
FIG. 14 shows meridional ray plots for the numerical example 2 of the invention with an object at a minimum distance (for $\beta=-1$) and with the image shake corrected at the focal plane against 1° vibration of the housing of the optical system from the original line of sight.

Figs. 1(A) and 1(B) and FIGS. 2(A) and 2(B) are longitudinal section views of numerical examples 1 and 2 of optical systems of the invention, respectively. Figs. 1(A) and 2(A) show the positions when the optical system is focused on an infinitely distant object, and Figs. 1(B) and 2(B) show the positions when the optical system is focused on a minimum distance object (for an image magnification $\beta=-1$).

The optical system comprises, from front to rear, a first lens unit L1 of positive refractive power and a second lens unit L2 of negative refractive power composed of a front lens sub-unit L2a of negative refractive power and a rear lens sub-unit L2b of positive refractive power. When focusing from an infinitely distance object to an object at a minimum distance, the first lens unit L1 moves axially toward the object side as indicated by an arrow 1a. For the purpose of correcting the shake of an image (stabilizing an image) at the focal plane against vibrations of the optical system, the front lens sub-unit L2a is selected as a movable lens unit for decentering in directions perpendicular to the optical axis as indicated by an arrow 2a.

In the present embodiments, such focusing and such image stabilizing provisions have been made. In addition, the optical parameters of the lens units are given ranges as set forth by the inequalities of conditions (1) and (2) described above. With these features or conditions satisfied, good correction of the shake of an image at the focal plane results with the limitation of the size of the entirety of the optical system to a minimum. Moreover, the transverse movement of the front lens sub-unit produces aberrations, that is, decentering coma, decentering astigmatism, decentering field curvature and other decentering aberrations, which are lessened for good optical performance.

The technical significances of the above-described conditions (1) and (2) are explained below.

The inequalities of condition (1) and the inequalities of condition (2) give ranges for the ratio of the focal length of the first lens unit which is moved axially during focusing to the focal length of the entire optical system, and for the ratio of the maximum total focusing movement of the first lens unit which magnifies the image up to, for example, $\beta=-1$, to its focal length, and have an aim chiefly to make a good compromise between the correction of all aberrations and the limitation of the required movement for the desired focusing range of the first lens unit. When the lower limit of the condition (1) is exceeded, as this means that the focal length of the first lens unit is too short, it becomes difficult to correct well the variation of all aberrations the first lens unit produces during focusing. Conversely when the upper limit is exceeded, as this means that the focal length of the first lens unit is too long, the required total movement for the predetermined image magnification of the first lens unit increases greatly which sacrifices the improvements of the compact form. When the lower limit of the condition (2) is exceeded, as this means that the maximum total focusing movement of the first lens unit is too short, the much desired increase of the image magnification becomes impossible to achieve. When the maximum total focusing movement of the first lens unit is too long as exceeding the upper limit of the condition (2), the operating mechanism gets larger in size. Moreover, to allow the illumination of the image frame to be kept sufficiently high over the entire area thereof, the outer diameter of the first lens unit increases objectionably.

Further, it is preferable that the condition (1) be modified to $0.5<f1/f<0.8$.

According to the invention, the above-described rules of lens design suffice for the increase of the dynamic range for correction of the image at the focal plane, while still permitting good stability of correction of decentering aberrations to be maintained throughout the entire focusing range, particularly the extended range even for close-up photography with an image magnification of from ½ times to unity ($\beta=-1$).

To further reduce the range of variation of decentering aberrations with image stabilizing over the entire dynamic range for better optical performance, it is recommended to satisfy at least one of the following features:

(i) The aforesaid front lens sub-unit L2a and the aforesaid rear lens sub-unit L2b each are made constructed in the form of a lens unit having at least one positive lens and at least one negative lens, thereby giving an advantage of improving the correction of the decentering aberrations produced when stabilizing the image.

In general, the decentering aberrations produced when stabilizing the image depend on the light rays entering each lens unit and emerging from each lens unit and the residual of aberrations of each lens unit. To achieve good correction of these aberrations, it becomes necessary to properly determine the refractive power arrangement of all the lens units and adequately regulate the residual of aberrations of each lens unit. On this account, in the present embodiment, each lens unit is constructed with inclusion of at least one positive lens and at least one negative lens. The residual of aberrations of each lens unit is thus corrected adequately. For example, suppose, as a certain refractive power is assigned to a lens unit, this lens unit is constructed with one lens, then the effective control of its Petzval sum is made only by increasing or decreasing the refractive index of the material of that lens. Under the premise that commonly available optical glasses are to use, however, because of the range of refractive indices being limited, it is impossible to vary the Petzval sum to a large extent. To allow the residual of aberrations of each lens to be controlled more freely, therefore, it is in the present embodiments that each lens unit is constructed in a form having at least one positive lens and at least one negative lens.

(ii) The following condition is to be satisfied:

$$0.15<|f2a/f|<0.5 \qquad (3)$$

where f2a is the focal length of the front lens sub-unit L2a.

The inequalities of condition (3) give a range for the ratio of the focal length of the front lens sub-unit L2a which moves in directions perpendicular to the optical axis when stabilizing the image to the focal length of the entire optical system. When the lower limit of the condition (3) is exceeded, as this means that the focal length of the front lens sub-unit L2a is too short, it becomes difficult to properly determine the residual of aberrations of the front lens sub-unit L2a by using a few constituent lenses in the front lens sub-unit L2a. In other words, it becomes difficult to improve the compact form of the lens system as a whole. Conversely when the focal length of the front lens sub-unit L2a is too long as exceeding the upper limit of the condition (3), this is advantageous at correcting various aberrations, but the required total movement for the dynamic range of stabilization of the image of the front lens sub-unit L2a increases objectionably, because the decenter sensitivity of the front lens sub-unit L2a (the ratio of the shifted amount of displacement of the image at the focal plane to the changed amount of displacement of the decentering lens unit) cannot be taken large.

(iii) The following condition is to be satisfied:

$$0.5<\Delta L/f1<0.8 \qquad (4)$$

where f1 is the focal length of the first lens unit and $\Delta L$ is the maximum focusing movement of the first lens unit.

The inequalities of condition (4) give a narrower range than that of the inequalities of condition (2). It is more preferred to satisfy the condition (4), so that the optical performance is maintained good particularly when in close-up photography with the image magnification being increased to unity or thereabout.

Next, an explanation is given to the aberrational features of the optical system having the image stabilizing function of the invention.

In general, if part of the optical system, or one lens unit, is parallel-decentered to correct the shake of an image at the focal plane, the image quality is caused to be lowered by the decentering aberrations produced. So, discussion will be made about the production of decentering aberrations in a case that, given any refractive power arrangement, the movable lens unit is made to move in directions perpendicular to the optical axis to correct the shake of the image, from the standpoint of the aberration theory on the basis of the method revealed by Yoshiya Matsui at the 23rd lecture meeting on applied physics in Japan (1962).

When part of the zoom lens, say lens unit P, is parallel-decentered by E, the amount of aberrations $\Delta Y1$ the entire system produces is expressed by an equation (a) of the sum of the amount of aberrations $\Delta Y$ that occurs before the decentering and the amount of decentering aberrations $\Delta Y(E)$ produced by the decentering. In here, the amount of aberrations $\Delta Y$ is expressed by spherical aberration (I), coma (II), astigmatism (III), Petzval sum (P) and distortion (Y). The amount of decentering aberrations $\Delta Y(E)$ is expressed by an equation (c) of primary decentering coma (IIE), primary decentering astigmatism (IIIE), primary decentering curvature of field (PE), primary decentering distortion (VE1), primary decentering distortion added aberration (VE2), and primary original point movement ($\Delta E$).

Equations (d) to (i) for the aberrations ($\Delta E$) to (VE2) are expressed under the condition that for the zoom lens having the lens unit P made to parallel-decenter, the on-axial and off-axial light rays are incident on the lens unit P at an angle $\alpha_p$, $\alpha a_p$, by using the aberration coefficients $I_p$, $II_p$, $III_p$ and $V_p$ of the lens unit P and also, as those lens units which are positioned on the image side of the lens unit P are all taken as one q-th lens unit, by using its aberration coefficients $I_q$, $II_q$, $III_q$, $P_q$ and $V_q$.

$$\Delta Y1 = \Delta Y + \Delta Y(E) \tag{a}$$

$$\Delta Y = -(1/(2\alpha_K'))((N_1 \tan\omega)^3 \cos\phi \cdot V + \tag{b}$$
$$(N_1 \tan\omega)^2 R(2\cos\phi\omega\cos(\phi_R - \phi\omega) \cdot III +$$
$$\cos\phi_R(III + P)) +$$
$$(N_1 \tan\omega) R^2(2\cos\phi_R\cos(\phi_R - \phi\omega) +$$
$$\cos\phi\omega) \cdot II + R^3 \cos\phi \cdot I)$$

$$\Delta Y(E) = -(E/(2\alpha_K'))((N_1 \tan\omega)^2((2 + \tag{c}$$
$$\cos 2\phi\omega)(VE1) - (VE2)) +$$
$$2(N_1 \tan\omega) R((2\cos(\phi_R - \phi\omega) +$$
$$\cos(\phi_R + \phi\omega))(IIIE) +$$
$$\cos\phi_R\cos\phi\omega \cdot (PE)) +$$
$$R^2(2 + \cos 2\phi_R)(IIE)) -$$
$$(E/(2\alpha_K'))(\Delta E)$$

$$(\Delta E) = -2(\alpha'_p - \alpha_p) = -2h_p\phi_p \tag{d}$$

$$(IIE) = \alpha a_p II_q - \tag{e}$$
$$\alpha_p(II_p + II_q) - \alpha a_p' I_q + \alpha a_p(I_p + I_q)$$
$$= h_p \phi_p II_q - \alpha_p II_p - (ha_p \phi_p I_q - \alpha a_p I_p)$$

$$(IIIE) = \alpha'_p III_q - \alpha_p(III_p + III_q) - \tag{f}$$
$$\alpha a_p' II_q + \alpha a_p(II_p + II_q)$$
$$= h_p \phi_p III_q - \alpha_p III_p - (ha_p \phi_p II_q - \alpha a_p II_p)$$

$$(PE) = \alpha'_p P_q - \alpha_p(P_p + P_q) \tag{g}$$
$$= h_p \phi_p P_q - \alpha_p P_p$$

$$(VE1) = \alpha'_p V_q - \alpha_p(V_p + V_q) - \tag{h}$$
$$\alpha a_p' III_q + \alpha a_p(III_p + III_q)$$
$$= h_p \phi_p V_q - \alpha_p V_p - (ha_p \phi_p III_q - \alpha a_p III_p)$$

$$(VE2) = \alpha a_p P_q - \alpha a_p(P_p + P_q) \tag{i}$$
$$= ha_p \phi_p P_q - \alpha a_p P_p$$

From the equations described above, to minimize the decentering aberrations produced, it is necessary to make small the values of all the aberration coefficients $I_p$, $II_p$, $III_p$, $P_p$ and $V_p$ of the lens unit P, or to determine them in good balance so that the aberration coefficients cancel each other out as shown by the equations (a) to (i).

Figure 15:
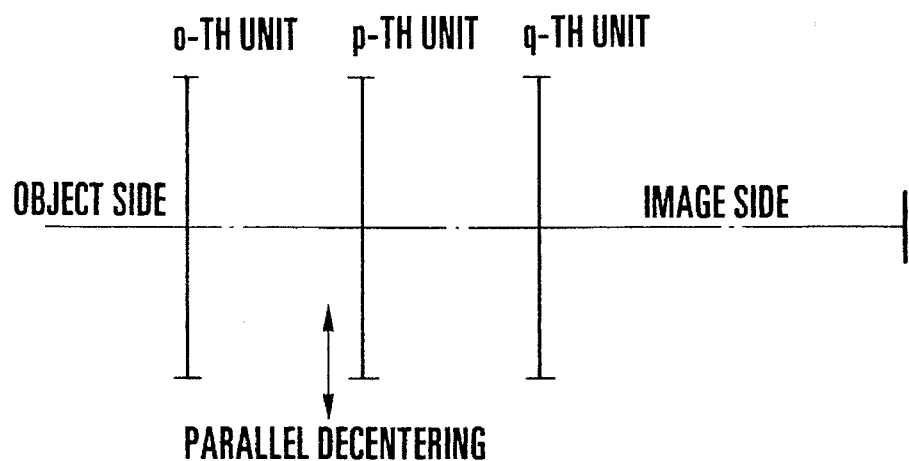
FIG. 15 is a schematic diagram of the construction of the optical system taken to explain the principle of correction of decentering aberrations in the invention.

Next, the optical action of the optical system having the image stabilizing function of the invention is described by taking a model on the assumption that the photographic optical system shown in FIG. 15 is moved in part in a direction perpendicular to the optical axis to effect decentering so that the displacement of the image at the focal plane is corrected.

At first, to realize sufficient correction for large displacements by sufficiently small decentering movements, it is necessary to make sufficiently large the primary original point movement ($\Delta E$) described above. With this in mind, a condition for correcting the primary decentering field curvature (PE) will be considered. FIG. 15 shows a photographic optical system comprising, from front to rear, an o-th lens unit, a p-th lens unit and a q-th lens unit, totaling three lens units. Of these, the p-th lens unit is parallel-moved in the directions perpendicular to the optical axis to correct the shaking of the image.

In here, the refractive powers of the o-th, p-th and q-th lens units are denoted by $\phi_o$, $\phi_p$ and $\phi_q$, respectively, the angles of incidence of the paraxial on-axial and off-axial light rays on any of these lens units are denoted by $\alpha$ and $\alpha a$, the heights of incidence of the paraxial on-axial and off-axial light rays are denoted by h and ha. The aberration coefficients, too, are expressed by using similar suffixes. It is also assumed that the lens units each are constructed with a small number of lens elements, and that each of the aberration coefficients tends to be under-corrected individually.

Under such a premise, on looking at the Petzval sum of each of the lens units, the Petzval sums $P_o$, $P_p$ and $P_q$ of the lens units are proportional to the refractive powers $\phi_o$, $\phi_p$ and $\phi_q$ of the lens units, approximately satisfying the following relationships:

$$P_o = C\phi_o$$
$$P_p = C\phi_p$$
$$P_q = C\phi_q$$

(where C is a constant)

Therefore, the primary decentering field curvature (PE) that is produced when the p-th lens unit is parallel-decentered, can be rearranged by inserting the equations described above as follows:

$$(PE) = C\phi_p(h_p\phi_q - \alpha_p)$$

To correct the decentering field curvature (PE), therefore, either $\phi_p = 0$ or $\phi_q = \alpha_p/h_p$ must be satisfied. If $\phi_p = 0$ is used, the original point movement ($\Delta E$) of 1st degree becomes "0" and correction of the shaking becomes impossible to perform. So, it is necessary to select $\phi_q = \alpha_p/h_p$, when a solution is sought for. Because $h_p > 0$, it is at least necessary to make $\alpha_p$ and $\phi_q$ of the same sign.

(a) For $\alpha_p > 0$

To correct the decentering field curvature, $\phi_q > 0$ results. Again, inevitably $\phi_o > 0$ results. Further, at this time, if $\phi_p > 0$, $0<\alpha_p<\alpha'_p<1$ results. Hence, the primary original point movement ($\Delta E$) is given by the following expression:

$$(\Delta E)=-2(\alpha_p'-\alpha_p)>-2$$

That is, the decenter sensitivity (the ratio of the deviation of the image to the unity of deviation of the decentering lens unit) becomes smaller than "1". If $\phi_p=0$, as described before, the decenter sensitivity is "0". Therefore, in such a case, $\phi_p<0$ is required.

(b) For $\alpha_p<0$

To correct the decentering field curvature (PE), $\phi_q<0$ results. Again, inevitably $\phi_o<0$ results. Therefore, further inevitably, $\alpha_p>0$ results.

From the above, to make sufficiently large the primary original point movement ($\Delta E$) and make it possible to correct the primary decentering field curvature, the optical system must take one of the following refractive power arrangements:

| Lens Unit: | | o | p | q |
|---|---|---|---|---|
| Power Arrangement | a: | plus | minus | plus |
| | b: | minus | plus | minus |

Figure 16A:
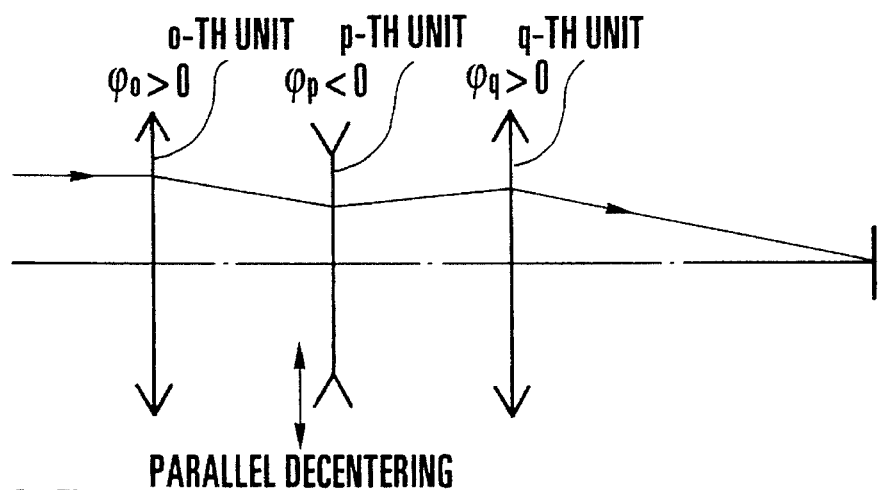
FIGS. 16(A) and 16(B) are schematic diagrams of the different power arrangements of the lens units taken to explain the principle of correction of decentering aberrations in the invention.
Figure 16B:
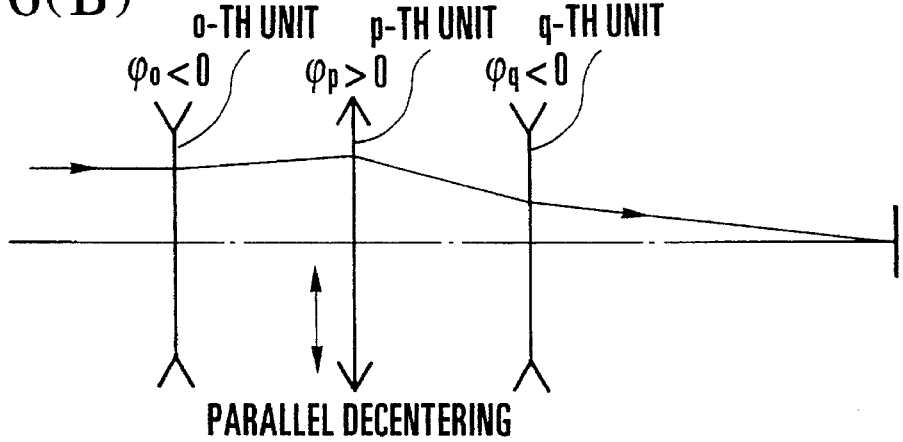

These refractive power arrangements are illustrated in FIGS. 16(A) and 16(B), respectively.

In the invention, there is a chance of selecting such refractive power arrangements. Next, the characteristic features of the lens configuration of the invention will be discussed. In general, the optical systems are corrected for aberrations well in the compact form of construction of the lens units by selecting a proper refractive power arrangement of the lens units. To form an optical system of the type in which a lens unit constituting part of the optical system is parallel-decentered in directions perpendicular to the optical axis to correct the displacement of the image at the focal plane, it is in the general case that selection of the movable lens unit for parallel decentering is better made from the points of view that there is a possibility of getting a high enough decenter sensitivity and that it becomes comparatively easy to correct decentering aberrations.

Meanwhile, for the purpose of improving the compact form of the housing of the instrument itself, it is desirable to select a lens unit of relatively short outer diameter as the parallel decentering one.

From the points of view described above, for the optical system that accomplishes the objects of the invention, use is made of the refractive power arrangement of FIG. 16(A).

That is, the optical system is constructed as comprising, from front to rear, a first lens unit having a positive refractive power and a second lens unit having negative refractive power, wherein the first lens unit moves axially to effect focusing, while the second lens unit remains stationary. The second lens unit is constructed as comprising a front lens sub-unit having a negative refractive power and a rear lens sub-unit having a positive refractive power, wherein the front lens sub-unit is made to move in directions perpendicular to an optical axis to effect stabilizing the image at the focal plane against vibrations.

In the present embodiment, by using the first lens unit for the focusing purposes, the reduced angles of inclination of the paraxial light ray in front of and behind the front lens sub-unit are made to be almost constant. In such a manner, the range of variation of decentering aberrations with focusing is limited to a minimum.

Next, numerical examples 1 and 2 of the invention are shown. In the numerical data for the examples 1 and 2, Ri is the radius of curvature of the i-th lens surface, when counted from the object side, Di is the i-th axial thickness or air separation, when counted from the object side, and Ni and vi are respectively the refractive index and Abbe number of the glass of the i-th lens element, when counted from the object side.

The values of the factors in the above-described conditions (1) to (3) for the numerical examples 1 and 2 are listed in Table-1.

(Numerical Example 1)

| | | | | | | | | |
|---|---|---|---|---|---|---|---|---|
| R 1 = | 68.45 | D 1 = | 4.5 | N 1 = | 1.69680 | v 1 = | 55.5 |
| R 2 = | −656.97 | D 2 = | 0.2 | | | | |
| R 3 = | 37.35 | D 3 = | 3.5 | N 2 = | 1.78590 | v 2 = | 44.2 |
| R 4 = | 70.62 | D 4 = | 0.3 | | | | |
| R 5 = | 39.68 | D 5 = | 3.5 | N 3 = | 1.78590 | v 3 = | 44.2 |
| R 6 = | 67.52 | D 6 = | 1.2 | | | | |
| R 7 = | 121.84 | D 7 = | 1.8 | N 4 = | 1.80518 | v 4 = | 25.4 |
| R 8 = | 24.87 | D 8 = | 16.0 | | | | |
| R 9 = | −34.06 | D 9 = | 1.8 | N 5 = | 1.69895 | v 5 = | 30.1 |
| R10 = | −78.70 | D10 = | 3.5 | N 6 = | 1.80610 | v 6 = | 41.0 |
| R11 = | −39.02 | D11 = | 0.2 | | | | |
| R12 = | 351.98 | D12 = | 2.5 | N 7 = | 1.78590 | v 7 = | 44.2 |
| R13 = | −98.37 | D13 = | 2.5 | | | | |
| R14 = | −1272.56 | D14 = | 3.5 | N 8 = | 1.80518 | v 8 = | 25.4 |
| R15 = | −29.07 | D15 = | 1.5 | N 9 = | 1.77250 | v 9 = | 49.6 |
| R16 = | 34.98 | D16 = | 3.5 | | | | |
| R17 = | −77.45 | D17 = | 1.5 | N10 = | 1.65160 | v10 = | 58.5 |
| R18 = | 77.58 | D18 = | 2.5 | | | | |
| R19 = | 66.06 | D19 = | 4.5 | N11 = | 1.69680 | v11 = | 55.5 |
| R20 = | −91.90 | D20 = | 0.2 | | | | |
| R21 = | 66.51 | D21 = | 1.8 | N12 = | 1.80518 | v12 = | 25.4 |
| R22 = | 31.53 | D22 = | 6.5 | N13 = | 1.60311 | v13 = | 60.7 |
| R23 = | −199.11 | | | | | | |

(Numerical Example 2)

| | | | | | | | | |
|---|---|---|---|---|---|---|---|---|
| R 1 = | 58.52 | D 1 = | 5.5 | N 1 = | 1.78590 | v 1 = | 44.2 |
| R 2 = | −270.61 | D 2 = | 0.2 | | | | |
| R 3 = | 40.87 | D 3 = | 4.5 | N 2 = | 1.78590 | v 2 = | 44.2 |
| R 4 = | 161.56 | D 4 = | 2.0 | | | | |
| R 5 = | −287.15 | D 5 = | 1.8 | N 3 = | 1.80518 | v 3 = | 25.4 |
| R 6 = | 34.75 | D 6 = | 16.0 | | | | |
| R 7 = | 4327.56 | D 7 = | 1.8 | N 4 = | 1.69895 | v 4 = | 30.1 |
| R 8 = | 46.73 | D 8 = | 2.0 | | | | |
| R 9 = | 60.05 | D 9 = | 4.0 | N 5 = | 1.80610 | v 5 = | 41.0 |
| R10 = | −70.35 | D10 = | 2.5 | | | | |
| R11 = | 194.63 | D11 = | 3.5 | N 6 = | 1.80518 | v 6 = | 25.4 |
| R12 = | −45.84 | D12 = | 1.5 | N 7 = | 1.77250 | v 7 = | 49.6 |
| R13 = | 30.78 | D13 = | 4.0 | | | | |
| R14 = | −54.38 | D14 = | 1.5 | N 8 = | 1.65160 | v 8 = | 58.5 |
| R15 = | 86.55 | D15 = | 2.5 | | | | |
| R16 = | 70.87 | D16 = | 4.5 | N 9 = | 1.69680 | v 9 = | 55.5 |
| R17 = | −87.16 | D17 = | 0.2 | | | | |
| R18 = | 67.07 | D18 = | 1.8 | N10 = | 1.80518 | v10 = | 25.4 |
| R19 = | 35.41 | D19 = | 6.5 | N11 = | 1.60311 | v11 = | 60.7 |
| R20 = | −164.77 | | | | | | |

TABLE 1

| Condition | | Numerical Example | |
|---|---|---|---|
| No. | Factor | 1 | 2 |
| (1) | f1/f | 0.630 | 0.629 |
| (2) | ΔL/f1 | 0.630 | 0.629 |
| (3) | f2a/f | 0.250 | 0.244 |

According to the invention, as described above, part of the optical system, or a lens unit, is made movable for decentering in perpendicular directions to an optical axis to correct the displacement (shake) of the image at the focal plane. For this purpose, proper rules of design are set forth for some of the lens parameters to achieve good correction of various decentering aberrations. In addition, it is realized that short enough decentering movements suffice for good enough correction of large displacements (shakes), thereby making it possible to construct the instrument as a whole in a compact form. Such an image stabilizing optical system is suited to be used particularly in close-up photography with an image magnification of from ½ times to unity.

What is claimed is:

1. A photographic lens system comprising, from front to rear, a first lens unit of positive refractive power and a second lens unit of negative refractive power, wherein said second lens unit has a front lens sub-unit of negative refractive power and a rear lens sub-unit of positive refractive power, wherein said front lens sub-unit is made movable for decentering to stabilize an image, and wherein said first lens unit is made axially movable for focusing; and wherein said lens system satisfies the following conditions:

$$0.35 < f1/f < 0.95$$

$$0.2 < \Delta L/f1 < 0.8$$

wherein f1 and f are the focal lengths of said first lens unit and the entire system, respectively, and $\Delta L$ is the maximum focusing movement of said first lens unit.

2. A photographic lens system according to claim 1, wherein said front lens sub-unit and said rear lens sub-unit each have at least one positive lens and at least one negative lens.

3. A photographic lens system according to claim 1, satisfying the following condition:

$$0.15 < |f2a/f| < 0.5$$

where f2a is the focal length of said front lens sub-unit.

4. A photographic lens system according to claim 1, further satisfying the following condition:

$$0.5 < f1/f < 0.8$$

* * * * *

UNITED STATES PATENT AND TRADEMARK OFFICE
CERTIFICATE OF CORRECTION

PATENT NO. : 5,598,299
DATED : January 28, 1997
INVENTOR(S) : SHINGO HAYAKAWA

It is certified that error appears in the above-indentified patent and that said Letters Patent is hereby corrected as shown below:

COLUMN 4

Line 41, "subunit." should read --sub-unit.--.

COLUMN 5

Line 34, "greatly" should read --greatly,--.

COLUMN 7

Line 27, "$III_p$" should read --$III_p$, $P_p$--.

Signed and Sealed this

Twenty-fourth Day of June, 1997

Attest:

BRUCE LEHMAN

Attesting Officer · Commissioner of Patents and Trademarks